Patented Aug. 12, 1941

2,252,527

UNITED STATES PATENT OFFICE 2,252,527

BODYING DRYING OILS WITH CELLULOSE ETHERS

Joseph L. Sherk and Norman R. Peterson, Midland, Mich., assignors to The Dow Chemical Company, Midland, Mich., a corporation of Michigan No Drawing. Application June 3, 1938, Serial No. 211,600

12 Claims. (Cl. 106—171)

This invention relates to the art of bodying drying oils and especially to a method whereby such oils may be bodied in a short time and with the production of a more satisfactory product than is obtained in the customary long time heat-bodying processes.

It is well known that drying oils may be cooked at elevated temperatures to produce an oil which has desirable properties not possessed by the raw oil. The cooking process is referred to as a bodying process since the product obtained therewith has greater viscosity than does the raw oil. A bodied varnish oil has good flow characteristics, readily wets pigments, and deposits films which ultimately dry with a high gloss and of a much greater resistance to water than do the films deposited from a raw oil. The varnish oils bodied by the old and well known cooking processes are not in all respects satisfactory since they have an increased acidity as compared with the raw oil, tend to sag when formulated into enamels and other coating compositions, are relatively tacky when spread as a film while in the liquid state, form films which are not appreciably tougher than those obtainable from the raw oil compositions, and may dry more slowly than the raw oil. The bodying operation itself, as ordinarily carried out, requires long periods of time, i. e., from 5 or 6 hours to as much as 2 or 3 days, the duration of the cooking operation depending in part upon the type of oil, the viscosity desired, and the temperature used.

Various attempts have been made to incorporate cellulose ethers in varnish oil compositions, generally with little success. The cellulose ethers are not soluble in varnish oils at ordinary temperatures nor are they readily incorporated in drying oils at elevated temperatures under the conditions heretofore reported. It has been observed that when cellulose ethers are added to drying oils and heated to the temperatures at which such oils are ordinarily cooked in bodying operations, the resulting product when cooled to room temperature is a non-flowable gel. The gel itself is frequently non-uniform and is immiscible with or insoluble in the customary varnish thinners such as naphtha and the like. Such products have been found useful, for example, as pore fillers and the like, but their insolubility in varnish vehicles and their inability to flow makes them useless as varnish components.

It is an object of the present invention to provide a cellulose ether-varnish oil composition which is miscible with or soluble in varnish vehicles such as naphtha and which may be prepared in a relatively short period of time as compared with the time required for the bodying of varnish oils by cooking methods alone. It is a further object to provide such a composition which is flowable at room temperature. It is another object of the invention to provide a cellulose ether-drying oil composition characterized by being relatively free from tack in the liquid state when spread as a film, by having good pigment wetting properties, being low in acidity, showing little tendency to sag, drying at an accelerated rate as compared with ordinary heat-bodied oils, being miscible with varnish thinners, and forming films which are appreciably tougher than those obtained from raw or heat-bodied oils.

We have found that the foregoing objects may be attained by cooking a relatively small amount, e. g., ordinarily from 1 to 15 per cent, of ethyl cellulose with a drying oil at a temperature in the range between about 500° and about 600° F. Cooking is continued while the composition forms the gelatinous type of product previously mentioned, and is carried on through this stage until a product is obtained which is flowable at room temperature. The so-formed material may be described as a sol rather than a gel. The so-formed sols are all miscible with equal weights of V. M. & P. naphtha. The gels formed in the early cooking stages are insoluble in such naphtha, but during the later stages of the cooking or bodying operation, while the composition is in a state of transition from the gel to the sol form, products are obtained which will tolerate an equal weight of naphtha and similar varnish thinners, and will form a clear solution even though these thinners are non-solvents for cellulose ethers alone.

In carrying out our invention, from 1 to 15 per cent (more may be employed to produce a product of greater viscosity) of ethyl cellulose, having an ethoxyl content between 42 and 50 per cent, is stirred into drying oil such as linseed oil, soy bean oil, perilla oil, or menhaden oil prior to or during the cooking of the oil. When the cooking is to be carried out in an open kettle, we prefer to add the ethyl cellulose to the oil when the latter has been heated to about 300° to 500° F. Addition of the ethyl cellulose at this point results in the formation of a lighter colored final product than is obtained if the oil and ethyl cellulose are mixed at room temperature and then heated to effect solvation of the ethyl cellulose in oil. If the apparatus in which the cooking is to be carried out is heated in inert atmosphere, e. g., carbon dioxide or nitrogen, the ethyl cellulose may be added to the oil at any temperature from room temperature to the final "top heat" encountered in the cooking operation, and a light colored product will be obtained.

After the ethyl cellulose has been added to the oil, the cooking temperature is raised to and held between 500° and 600° F. Samples taken from the cook immediately after addition of the ethyl cellulose are, when cooled, non-uniform, "lumpy" liquids or extremely cloudy gels, depending in part on the amount of ethyl cellulose present and in part on the temperature of the cook. At this stage no appreciable reaction has taken place between the oil and the ethyl cellulose and the components of the mixture are not mutually compatible.

As cooking proceeds, samples taken periodically from the cook become increasingly clear, producing at one stage in the operation, which appears to exist for a considerable period of time, clear solutions which when cooled form clear, substantially immobile gels. Continued cooking results in the formation of clearer, less rigid gels, succeeded by the formation of a composition which is partially gel and partially sol, and finally by a clear, flowable sol. Samples taken from the cook just prior to conversion of the composition to flowable sols, and throughout the sol stage, all form clear solutions with equal weights of V. M. & P. naphtha. Such naphtha solutions, if spread upon a surface, will deposit clear, tough films.

While the oil and ethyl cellulose are compatible throughout the clear gel stage, the ethyl cellulose has not become entirely oil-soluble. The third or final stage in the process which is characterized by the entire disappearance of the visible gel structure and which we have previously referred to as the sol stage, yields a material which is not only clear and flowable, but which is as homogeneous as any heat-bodied varnish oil and is more viscous than the same oil subjected to the same cooking schedule but without the cellulose ether.

The following examples illustrate the practice of our invention:

EXAMPLE 1

Table I is a detailed study of a typical soy bean oil-5 per cent ethyl cellulose cook, showing the various stages through which the composition passes during the bodying operation.

The time required to effect the transition from the incompatible stage through the uniform stiff gel stage to the sol varies inversely as the temperature employed during the cooking. In any event the time required to produce a cellulose ether-bodied drying oil is only a fraction of the time required for heat-bodying such oils. To illustrate, if 3 per cent of ethyl cellulose is added to a varnish grade of linseed oil while the latter is being heated, at about 400° F., it will require approximately 80 minutes at 520° F. or only 25 minutes at 560° F. to produce the completely soluble, flowable, cellulose ether-bodied oil.

The viscosity of oils bodied by the present process varies according to the per cent and type of ethyl cellulose employed, the cooking schedule, and the acid number of the original oil. High percentages of ethyl cellulose produce high viscosity oils. Similarly, ethyl cellulose of high intrinsic solution viscosity produces higher viscosity oils than low viscosity type ethyl cellulose. Prolonged heating of the ethyl cellulose-oil composition, either before or after reaction has occurred between the oil and the ethyl cellulose, tends to reduce the viscosity of the cellulose ether-bodied oil. The lower the acid number of the original oil, the longer will be the cooking time required and the higher will be the resultant viscosity. We prefer, however, to employ those drying oils which have an acid number in the range which has been found satisfactory for preparation of varnishes from heat-bodied oil, namely, between 0.2 and 5.0 per cent.

EXAMPLE 2

The following table sets forth the conditions employed in a number of our experimental runs, in each of which a flowable ethyl cellulose-bodied drying oil was produced. In the said table, runs 1 to 3, inclusive, are a study of the effect of varying percentages of ethyl cellulose; runs 3 and 4 illustrate the effect on the time required of varying the temperature to which the composition is heated; runs 5–7, inclusive, are a study of the applicability of the process to various types of drying oils; runs 8–12, inclusive, illustrate the effect of varying acid numbers in the original oil upon the viscosity of the bodied oil produced; runs 13 and 14 compare the effect upon the final oil viscosity of the initial intrinsic solution viscosity of the ethyl cellulose; and runs 15–17, inclusive, which were made in an atmosphere of carbon dioxide, are a series illustrating the effect

*Table I*

|  | Time, minutes | Temperature, ° F. | No. of sample removed | Acid No. of oil in sample, corrected for cellulose ether | Viscosity in poises of oil-ethyl cellulose composition at 77° F. | Viscosity in poises of oil-ethyl cellulose in solvent* at 77° F. |
|---|---|---|---|---|---|---|
|  | 0 | 60 |  | 0.65 |  |  |
|  | 20 | 310 |  | 0.7 |  |  |
| Phase I | 27 | 400 | Ethyl cellulose added |  |  |  |
| Phase I | 37 | 500 | 2 | 0.8 |  | 0.5 |
| Phase I | 42 | 540 | 3 | 0.93 |  | 0.54 |
| Phase I | 47 | 570 | 4 | 1.16 |  | 1.8 |
| Phase I | 52 | 570 | 5 | 1.34 |  | 2.5 |
| Phase I | 57 | 570 | 6 | 1.42 |  | 2.0 |
| Phase II | 62 | 570 | 7 | 1.44 | 46 | 1.9 |
| Phase II | 67 | 570 | 8 | 1.55 | 38 | 1.8 |
| Phase II | 72 | 570 | 9 | 1.62 | 31 |  |
| Phase III | 77 | 558 | 10 | 1.72 | 22 | 1.3 |
| Phase III | 82 | 530 | 11 | 1.74 | 18 | 1.3 |
| Phase III | 87 | 500 | 12 | 1.74 | 18 | 1.3 |
| Phase III | 92 | 475 | 13 | 1.77 | 18 | 1.3 |
| Phase III | 97 | 450 | 14 | 1.77 | 18 |  |

*Viscosity in solvent determined on a solution consisting of 75% by weight of the oil-ethyl cellulose composition and 25% of a mixture of 80 parts of xylene and 20 parts of butanol, by volume.

Phase I.—Incompatibility—no reaction—cloudy gel.
Phase II.—Clear gel—reaction proceeding.
Phase III.—Clear viscous sol or gel-sol mixture, miscible with an equal weight of naphtha.

of prolonged heating of the composition at "top heat" during the cooking operation. The original ethyl cellulose viscosity is determined at 77° F. on a 5 per cent solution thereof by weight in a mixture of 80 parts of toluene and 20 parts of ethanol, by volume.

employed in the formulation of varnishes, paints, and similar air-drying coating compositions. As shown by Examples 3 and 4, tung oil may be used when properly treated to retard gelation of the oil. In general, then, the oils which may be used are those which are not subject to quick Table II

| Run No. | Original oil | | Ethyl cellulose | | Cooking schedule | | | | | | Resultant oil | |
|---|---|---|---|---|---|---|---|---|---|---|---|---|
| | Kind acid | No. | Percent | Visc. | Time to top heat, minutes | Temp. of "Ethocel" addition | Top heat | Time at top heat to break gel, minutes | Total time at top heat, minutes | Cooling time, top heat to 400° F., minutes | Visc. | Acid No. |
| 1 | Linseed | 2.2 | 3 | 93 | 40 | 450 | 560 | 25 | 30 | 41 | 3.9 | 2.9 |
| 2 | do | 2.2 | 5 | 93 | 58 | 70 | 570 | 15 | 20 | 35 | 8 | 3.4 |
| 3 | do | 2.2 | 8 | 93 | 40 | 450 | 560 | 25 | 30 | 41 | 44 | 3.1 |
| 4 | do | 2.2 | 8 | 93 | 38 | 450 | 520 | 80 | 100 | 25 | 65 | 2.7 |
| 5 | Soy bean | 1.5 | 7 | 87 | 45 | 400 | 570 | (*) | 15 | 38 | 40 | 2.0 |
| 6 | Perilla | 1.5 | 7 | 87 | 41 | 400 | 570 | (*) | 15 | 38 | 40 | 2.2 |
| 7 | Linseed | 1.9 | 7 | 87 | 42 | 400 | 570 | (*) | 15 | 38 | 40 | 2.7 |
| 8 | Soy bean | 0.5 | | | 44 | | 570 | | 30 | 31 | 0.5 | 0.94 |
| 9 | do | 0.5 | 5 | 87 | 42 | 400 | 570 | 25 | 30 | 31 | 18 | 1.6 |
| 10 | do | 0.7 | 5 | 87 | 45 | 400 | 570 | 25 | 30 | 30 | 17 | 1.7 |
| 11 | do | 0.9 | 5 | 87 | 40 | 400 | 570 | 18 | 30 | 33 | 13 | 1.8 |
| 12 | do | 1.1 | 5 | 87 | 42 | 400 | 570 | 18 | 30 | 31 | 12 | 1.9 |
| 13 | do | 1.1 | 10 | 87 | 45 | 400 | 570 | 26 | 30 | 30 | 105 | 2.2 |
| 14 | do | 1.5 | 10 | 10 | 82 | 470 | 570 | | 30 | 55 | 23 | 2.0 |
| 15 | do | 0.5 | 5 | 98 | 86 | 450 | 570 | | 8 | 60 | 40 | 1.3 |
| 16 | do | 0.5 | 5 | 98 | 88 | 450 | 570 | | 13 | 60 | 26 | 1.4 |
| 17 | do | 0.5 | 5 | 98 | 90 | 450 | 570 | | 30 | 60 | 20 | 1.8 |

*Gel broken on "down heat."

EXAMPLE 3

To 85 parts by weight of tung oil was added 5 parts of glycerine, to retard gelation of the oil, and 10 parts by weight of a 20 centipoise ethyl cellulose having an ethoxyl content of about 48.5 per cent. The various ingredients were stirred together at room temperature and the mixture heated to 500° F. over a period of 26 minutes, when a cooled sample removed from the cook remained clear. The batch was allowed to cool, and was found to be a clear, uniform, flowable, viscous oil. The product was completely miscible with an equal weight of mineral spirits.

EXAMPLE 4

A composition prepared from a mixture of equal volumes of tung and linseed oils and ethyl cellulose was similar in properties to a linseed oil-ethyl cellulose composition prepared in like manner.

EXAMPLE 5

10 parts by weight of 20 centipoise ethyl cellulose was mixed with 90 parts of oiticica oil. The mixture was heated to 550° F. in a period of 17 minutes. This temperature was held for 10 minutes, when cooled samples were found to be clear, uniform, and flowable. The cook was then allowed to cool, and a product was obtained similar to those previously described.

The invention has been illustrated with reference to the preparation of drying oils bodied with ethyl cellulose as the cellulose ether. Other cellulose ethers may be employed in a similar manner to produce analogous oil compositions. For example, we have employed methyl ethyl cellulose and have found it to be as satisfactory in many respects as the ethyl cellulose-oil composition. In a like manner, other cellulose alkyl ethers such as ethyl propyl cellulose, butyl cellulose, ethyl butyl cellulose, and the like, may be employed.

The oils which have been shown in the various examples herein are linseed, soy bean, perilla, oiticica, and tung oils. There may be used instead sunflower oil, safflower oil, menhaden oil, and other drying or polymerizing oils ordinarily employed in the formulation of varnishes, paints, and similar air-drying coating compositions. As shown by Examples 3 and 4, tung oil may be used when properly treated to retard gelation of the oil. In general, then, the oils which may be used are those which are not subject to quick gelation when heated to 500° to 600° F. Such oils may be those which are naturally free from quick gelation on heating to such temperatures, or they may be oils, such as tung oil, which are treated to retard gelation. The oil employed may be either a raw oil, refined oil, or an oil which has already been bodied by heat.

The herein-described process is useful in the preparation of bodied oils which may be employed alone, as in the preparation of oil-finished surfaces, or in combination with raw oils, resins, gums, wood stains, pigments, and the like, in any of the types of coating compositions in which heat-bodied oils are customarily employed. The increased viscosity of the composition and toughness of the films deposited thereby as compared with those producible from heat-bodied oils alone make our compositions extremely useful in the preparation of varnishes, paints, etc.

Other modes of applying the principle of our invention may be employed instead of the one explained, change being made as regards the process herein disclosed, provided the step or steps stated by any of the following claims or the equivalent of such stated step or steps be employed, or the products recited in the claims be thereby obtained.

We therefore particularly point out and distinctly claim as our invention:

1. The process which consists in (1) mixing from 1 to about 15 per cent of a cellulose alkyl ether with correspondingly from 99 to about 85 per cent of a drying oil selected from the group consisting of linseed oil, menhaden oil, oiticica oil, perilla oil, safflower oil, soybean oil, sunflower oil, tung oil treated to retard gelation, and mixtures thereof, (2) heating the oil-cellulose ether mixture to a temperature in the range from 500° to 600° F., (3) cooking the mixture in the said temperature range (a) to produce a non-uniform gel, cooled samples of which are immiscible with mineral spirits, (b) continuing the cooking at 500° to 600° F. through an intermediate physical stage of the oil-cellulose ether mixture wherein cooled samples are apparently uniform and less rigid gels than those in the first stage, and (c) continuing the cooking at 500° to 600° F. to produce a third and final stage of the oil-cellulose ether mixture, whereof cooled samples are clear and flowable, and are miscible with equal weights of mineral spirits to form clear solutions, the product being as homogeneous as, and more viscous than the same drying oil subjected to the same cooking schedule but without the cellulose ether.

2. The process which consists in (1) mixing from 1 to about 15 per cent of a cellulose alkyl ether with correspondingly from 99 to about 85 per cent of a drying oil selected from the group consisting of linseed oil, menhaden oil, oiticica oil, perilla oil, safflower oil, soybean oil, sunflower oil, tung oil treated to retard gelation, and mixtures thereof, (2) heating the oil-cellulose ether mixture to a temperature in the range from 500° to 600° F., (3) cooking the mixture in the said temperature range (a) to produce a non-uniform gel, cooled samples of which are immiscible with mineral spirits, (b) continuing the cooking at 500° to 600° F. through an intermediate physical stage of the oil-cellulose ether mixture wherein cooled samples are apparently uniform and less rigid gels than those in the first stage, and (c) continuing the cooking at 500° to 600° F. to produce a third and final stage of the oil-cellulose ether mixture, whereof cooled samples are clear and flowable, and are miscible with equal weights of mineral spirits to form clear solutions, then (4) discontinuing the cooking operation, and (5) cooling the product which is as homogeneous as, and more viscous than the same drying oil subjected to the same cooking schedule but without the cellulose ether.

3. The process which consists in (1) mixing from 1 to about 15 per cent of ethyl cellulose with correspondingly from 99 to about 85 percent of a drying oil selected from the group consisting of linseed oil, menhaden oil, oiticica oil, perilla oil, safflower oil, soybean oil, sunflower oil, tung oil treated to retard gelation, and mixtures thereof, (2) heating the oil-cellulose ether mixture to a temperature in the range from 500° to 600° F., (3) cooking the mixture in the said temperature range (a) to produce a non-uniform gel, cooled samples of which are immiscible with mineral spirits, (b) continuing the cooking at 500° to 600° F. through an intermediate physical stage of the oil-cellulose ether mixture wherein cooled samples are apparently uniform and less rigid gels than those in the first stage, and (c) continuing the cooking at 500° to 600° F. to produce a third and final stage of the oil-cellulose ether mixture, whereof cooled samples are clear and flowable, and are miscible with equal weights of mineral spirits to form clear solutions, then (4) discontinuing the cooking operation, and (5) cooling the product which is as homogeneous as, and more viscous than the same drying oil subjected to the same cooking schedule but without the cellulose ether.

4. The process which consists in (1) mixing from 1 to about 15 per cent of ethyl cellulose with correspondingly from 99 to about 85 per cent of a drying oil selected from the group consisting of linseed oil, menhaden oil, oiticica oil, perilla oil, safflower oil, soybean oil, sunflower oil, tung oil treated to retard gelation, and mixtures thereof, while the said oil is being heated at a temperature of from 300° to 500° F., (2) heating the oil-cellulose ether mixture to a temperature in the range from 500° to 600° F., (3) cooking the mixture in the said temperature range (a) to produce a non-uniform gel, cooled samples of which are immiscible with mineral spirits, (b) continuing the cooking at 500° to 600° F. through an intermediate physical stage of the oil-cellulose ether mixture wherein cooled samples are apparently uniform and less rigid gels than those in the first stage, and (c) continuing the cooking at 500° to 600° F. to produce a third and final stage of the oil-cellulose ether mixture, whereof cooled samples are clear and flowable, and are miscible with equal weights of mineral spirits to form clear solutions, then (4) discontinuing the cooking operation, and (5) cooling the product which is as homogeneous as, and more viscous than the same drying oil subjected to the same cooking schedule but without the cellulose ether.

5. The process as claimed in claim 3, wherein the drying oil employed is linseed oil.

6. The process as claimed in claim 3, wherein the drying oil employed is soybean oil.

7. The process as claimed in claim 3, wherein the drying oil employed is tung oil which has been treated to retard gelation.

8. A clear, flowable cellulose alkyl-ether-bodied oil selected from the group consisting of linseed oil, menhaden oil, oiticica oil, perilla oil, safflower oil, soybean oil, sunflower oil, tung oil, treated to retard gelation, and mixtures thereof, being identical with the product obtained by the method of claim 2, and containing from 1 to 15 per cent of the cellulose ether, and correspondingly from 99 to 85 per cent of the oil.

9. A clear, flowable ethyl cellulose-bodied oil selected from the group consisting of linseed oil, menhaden oil, oiticica oil, perilla oil, safflower oil, soybean oil, sunflower oil, tung oil treated to retard gelation, and mixtures thereof, being identical with the product obtained by the method of claim 3, and containing from 1 to 15 per cent of ethyl cellulose and correspondingly from 99 to 85 per cent of the oil.

10. A clear, flowable ethyl cellulose-bodied linseed oil, being identical with the product obtained by the method of claim 3 when the oil employed is linseed oil, and containing from 1 to 15 per cent of ethyl cellulose and correspondingly from 99 to 85 per cent of the oil.

11. A clear, flowable ethyl cellulose-bodied soybean oil, being identical with the product obtained by the method of claim 3 when the oil employed is soybean oil, and containing 1 to 15 per cent of ethyl cellulose and correspondingly from 99 to 85 per cent of the oil.

12. A clear, flowable ethyl cellulose-bodied tung oil, being identical with the product obtained by the method of claim 3 when the oil employed is tung oil which has been treated to retard gelation, and containing from 1 to 15 per cent of ethyl cellulose and correspondingly from 99 to 85 per cent of the oil.

JOSEPH L. SHERK.
NORMAN F. PETERSON.